US007104798B2

(12) United States Patent
Spaventa (10) Patent No.: US 7,104,798 B2
(45) Date of Patent: Sep. 12, 2006

(54) LANGUAGE TEACHING METHOD

(76) Inventor: Virginia Spaventa, 3145 Turkey Hill Rd., Winston-Salem, NC (US) 27106

( * ) Notice: Subject to any disclaimer, the term of this patent is extended or adjusted under 35 U.S.C. 154(b) by 461 days.

(21) Appl. No.: 10/394,865

(22) Filed: Mar. 24, 2003

(65) Prior Publication Data
US 2005/0069845 A1    Mar. 31, 2005

(51) Int. Cl.
*G09B 19/00* (2006.01)
(52) U.S. Cl. ...................................... 434/156
(58) Field of Classification Search ............... 434/155, 434/159, 167, 170, 171, 172, 176
See application file for complete search history.

(56) References Cited

U.S. PATENT DOCUMENTS

| | | | | | |
|---|---|---|---|---|---|
| 3,215,435 | A | * | 11/1965 | Rheingruber | 273/249 |
| 3,302,310 | A | * | 2/1967 | Leven | 434/171 |
| 3,482,333 | A | * | 12/1969 | Trager | 273/299 |
| 3,670,427 | A | * | 6/1972 | Stolpen | 434/157 |
| 3,903,617 | A | * | 9/1975 | Evans | 434/171 |
| 4,006,541 | A | * | 2/1977 | Miller | 434/308 |
| 4,044,476 | A | * | 8/1977 | Marsh | 434/171 |
| 4,345,902 | A | * | 8/1982 | Hengel | 434/170 |
| 4,443,199 | A | * | 4/1984 | Sakai | 434/170 |
| 4,478,582 | A | * | 10/1984 | Tucker | 434/170 |
| 4,643,683 | A | * | 2/1987 | Orsini et al. | 434/403 |
| 4,822,283 | A | * | 4/1989 | Roberts | 434/171 |
| 5,013,245 | A | * | 5/1991 | Benedict | 434/170 |
| 5,487,670 | A | * | 1/1996 | Leonhardt | 434/167 |
| 5,567,159 | A | * | 10/1996 | Tehan | 434/178 |
| 5,788,503 | A | * | 8/1998 | Shapiro et al. | 434/172 |
| 6,375,467 | B1 | * | 4/2002 | Grant | 434/167 |
| 6,604,947 | B1 | * | 8/2003 | Rai | 434/170 |
| 6,685,477 | B1 | * | 2/2004 | Goldman et al. | 434/172 |

* cited by examiner

*Primary Examiner*—Kurt Fernstrom (57) ABSTRACT

A method of teaching students a language utilizing a coded medium through verbal and nonverbal communication. The students unconsciously learn the structure of the language through color, sound, shape/texture, a verb puzzle piece, gestures and grammar stories. The method includes the presentation of a new linguistic structure to the students to elicit linguistic responses from the students. The students are encouraged to respond verbally. A student is then directed to display the linguistic structure using the coded medium. The student response is then reviewed and corrected to ensure that all students use the correct gesture referencing time when addressing the puzzle piece. The teacher moves the coded medium corresponding to the correct punctuation to teach word order, syntax, cohesion and other linguistic features. A second student is directed to respond to the first student verbally and by displaying the linguistic structure with the coded medium. The students are directed to write the linguistic structure and draw pictures of the coded medium corresponding to the linguistic structure. These activities are repeated until quick and skillful responses are delivered automatically. Grammar stories are role played and reinforce the language program. The grammar stories, manipulation of the coded medium and the verb puzzle pieces and suffix word used in the method put language in a time and space relationship. Thus students unconsciously learn the structure of the language through the coded medium, gestures and grammar stories.

10 Claims, 12 Drawing Sheets

| A | a |
|---|---|
| An | an |
| The | the |

LANGUAGE TEACHING METHOD

BACKGROUND OF THE INVENTION

1. Field of the Invention

The present invention relates generally to a language teaching method and more particularly to a method for teaching a native or foreign language including teaching punctuation and syntactic and semantic awareness to students learning a new language, to students learning a basic language who are speech impaired, dyslexic or autistic and to students of exceptional ability.

2. Description of the Prior Art

There are many methods or systems for teaching languages. One of the first was the grammar translation method primarily used from 1840 to 1940 and still used today in some schools. The objective in this system is to read the foreign language. Grammar is analyzed in great detail, and translations are made from the native to the foreign language. The sentence is the basic unit, accuracy is the goal and grammar is taught deductively. Rules are stated directly.

Eventually strict grammar translation was viewed as too tedious, and speaking and listening to the new language became important. The direct method was introduced first in France and Germany by Charles Berlitz. He believed in using only the foreign language. Oral skills are emphasized, grammar is taught inductively and students eventually learn the governing rules.

Situational language teaching (England) and audio-lingual teaching (USA) methods then evolved both of which emphasized oral skills. Dialogues are memorized, and the drills are teacher led. The focus is on grammatical correctness, and the method is teacher centered. The program is premised on the theory that the language being taught improves as a result of pattern practice. These are behaviorist beliefs.

Confluent language education was introduced and is based on humanistic psychology. The students guide the content and learn through interpersonal contact and self-awareness.

James Asher introduced total physical response in 1969. Children listen first, then speak. The focus is on speaking. Children speak when they choose. Visual aids are used, and errors are not corrected.

The Suggestopedia program came about in the early 1970's and is based on learning a language in a stress free environment. Classical music is played in comfortable and pleasant surroundings. A dialogue is played first in the students' native language and then in the target language. Students are told to relax and repeat. They interact with each other, and few corrections are made. At the end of each class, there is a question and answer exchange in the students' native language.

The natural approach teaching method was developed initially by Krashen and later refined by Terrel in 1977. They based the method on the belief that there is a natural acquisition of language. They spoke of the learning acquisition hypotheses. Acquisition (the unconscious or naturalistic way of getting information) and learning by the students constitute the process by which conscious rules are developed. The monitor hypothesis is a conscious learning of functions as a monitor for purposes of correctness. The natural order hypothesis is the acquisition of grammatical structures that builds in a sequential and predictable order. The studies of errors means that the natural development process is taking place. The input hypothesis means that language students must receive comprehensible input to develop competence in a second language. This input must be just beyond the students' performance and is referred to as "input and just beyond." Affective filter hypothesis means that input must contain a message that is needed by the learner and the learning environment must be as free from anxiety as possible. Languages are learned in stages; i.e., the silent period and three (3) other stages of speech emergence in varying degrees. After the silent period, the learners begin to speak, and the teacher accepts all attempts to communicate even if incorrect. The teacher expands but does not correct. No drills are practiced because they serve no communicative purpose.

In the 1980's, communicative language brought forth a more interactive language teaching approach. It is based on the premise that students learn a language by using it to communicate. The goal of classroom activities is to carry out authentic and meaningful communication. Acquiring fluency is important in communicating. Communication requires integrating different language skills. Learning is creative and requires trial and error. As a result of these beliefs about language acquisition, cooperative language learning, content based teaching and task-based teaching methods were developed.

BACKGROUND AND SUMMARY OF THE INVENTION

In his book entitled *The Mind of a Mnemonist*, Dr. Richard Cytowic expounded on the synesthesia method of teaching which employs sensory fusion to achieve a longer memory span and deeper understanding of a language. Synesthetic perceptions are durable, discrete and generic. Thus this method uses associations that are durable and not changeable with a discrete (one to one association) in a simple perception. Synesthesia is also memorable where parallel sensations are easily and vividly remembered, often in preference to the stimulus that triggered them. It is a good mnemonic aid. Synesthesia is emotional and noetic. The limbic brain, a structure much older than the cortex, deals with emotion and memory and provides the sense of conviction that individuals attach to their ideas and beliefs. The limbic system, buried deep within the temporal lobe, is the seat of synesthesia. The method uses sense fusions for learning language, memory enhancement of linguistic items and emotion which makes the learning complete.

The present invention is a method which is based on the principle that there is a greater degree of learning when the system used is multi-sensory; i.e., the Orton Gillingham method. The method of the present invention uses the auditive, kinesthetic, visual and tactile senses. In one embodiment, it employs color-coded cards, since the use of color can result in a twenty five percent (25%) better memory retention. Using color invokes a logical pattern, and the brain is pattern seeking (visual). The learners manipulate the cards (tactile). Sound and music are used with a logical pattern because the brain is pattern seeking (auditive). Movement to place language in a time/space is used (kinesthetic). Stories with characters which bring language to life are used to give language meaning and feeling (kinesthetic). Gestures are also used (kinesthetic). Grammar stories which solidify abstract grammar concepts are used. Verbs are represented in a puzzle piece format which helps students to go from the whole word to its parts and permits mobility to relate the different sentence parts to the suffix of the verb. Hands-on learning is achieved through the students using the color cards to create their own sentences. Mental exercise fuels the brain with oxygen and feeds it neurotropins to enhance growth and greater connections between neurons. Students go to the display board, manipulate the cards and walk around the classroom to review other students' work. Students also role-play the color theme by creating people color and sound sentences. It is critical to the formation of long term memory to introduce batches or chunks of focused learning time.

Sound and shape/texture cover two (2) additional immediate embodiments of the present invention. Various musical instruments are played in the sound version, and objects having various shapes and textures are viewed and touched in the shape/texture version.

The method of the present invention is preferably made up of eight (8) steps which are batched or chunked to retain the students' attention. Students with learning difficulties because of severe trauma must refocus their thinking process before they can effect a change. Thus the invention provides opportunities for positive, successful experiences to implement the thinking process change.

The present invention is based on the concept that learning a language is unconscious learning and conscious understanding. This approach to learning a language is based on getting students to generate grammar and understand movement within the sentence. Students must first hear and feel language and will learn language through nonverbal (paralinguistic) communication features such as gestures, tone of voice, visual aids, hesitations and so on. If a student sees the language in written form first, undesirable phonemic relationships back to the mother tongue will occur.

This invention recognizes that learning a new language requires authentic and meaningful communication to students while exposing students to new structures and vocabulary numerous times to create long term memory. A native speaker needs to be exposed to a new vocabulary item about fourteen (14) times before he or she incorporates it into standard vocabulary. The invention combines authentic communication with unconscious learning to conscious understanding of the items being taught. Students with learning disabilities need this approach to retain new information. Through color, sound, shape/texture coding, students create a file from which they can retrieve syntactic structure or lexical items when they are needed. Students are also taught to categorize, a difficult task for many students with speech disorders.

The present method of teaching a language either as a foreign language or as a method for teaching a language's structure to students with learning disabilities, speech impairments and varying levels of intelligence uses novelty strategies to reach students with different learning needs. Language is presented using simple coding which enables students with disabilities to access language visually and later process the language visually, auditively through music, sound coding and touch/texture. It is also processed by students listening to and repeating the new structures being taught. The grammar stories, manipulation of the coded medium and the verb puzzle pieces and suffix word used in the method put language in a time and space relationship. Students unconsciously learn the structure of the language through the coded medium, gestures and grammar stories.

In summary, the present invention, in its preferred form, is a method of teaching students a language utilizing a coded medium through verbal and nonverbal communication features so that the students unconsciously learn the structure of the language through color, sound, shape/texture, a verb puzzle piece, gestures and grammar stories. The method includes the steps of presenting a new linguistic structure to the students to elicit linguistic responses from the students, having the students respond to the linguistic structure verbally, having a first student display the linguistic structure using the coded medium, receiving and correcting the verbal response to ensure that the students use the correct gesture referencing time when addressing the puzzle piece, moving the coded medium which corresponds to the correct punctuation to teach word order, syntax, cohesion and other linguistic features, having a second student respond to the first student verbally and by displaying the linguistic structure with the coded medium, and having the students write the linguistic structure and draw pictures of the coded medium corresponding to the linguistic structure.

While the preferred method has been outlined above, a language may be taught effectively if some of the steps are omitted. For example, students singing songs with gestures, the timed testing exercises and student assessment may be removed from the program. It will still be effective as a viable teaching program without these steps although the learning process may take more time to implement.

DETAILED DESCRIPTION OF THE INVENTION

Set forth below is the color-coding used in one embodiment of the present invention.

Color Cards: Color-coding

| Color Syntactic unit | FIG. | Examples |
|---|---|---|
| (Red) Interrogative pronouns: | 1 | When Where Who Whose How many How much |
| (Yellow) Auxiliaries and modal auxiliaries: | | Is Am Are Was were be can could do does did has have had may might must need shall should will would have to |
| (Orange) Pronouns: | 3 | I, You, He, She, It, We, You, They, Mine, Yours, His, Hers, Ours, Yours, Theirs, Me, You, Him, Her, It, Us, You, Them, Myself, Yourself, Himself, Herself, Itself, Ourselves, Yourselves, Themselves, This, That, These, Those |
| (Blue) Adverbs | 4 | Always, often, usually, some times, rarely, seldom, never |
| (puzzle piece) main verb + ing, s/es, ed | 6 | walking, talks, cries, played |
| main verb + empty puzzle piece | 6 | walk, talk, cry, play |
| irregular verb + empty puzzle piece | 6 | went, gone, sent, bought |
| (green) Adjectives | 8 | My, Your, His, Her, Our, Your, Their, big, expensive, good, bad, fat |
| (green) Comparative adjectives | 8 | happier, happiest |
| (white) Noun suffixes | 10 | Boy, girl, boys, girls |
| (purple) Adverbial adjuncts: | 11 | Everyday, once a week, every morning, every afternoon, every night, at 9:00 o'clock, on Thursdays, on my Birthday, now, at this moment, right now, yesterday, in 1942, last week, last month, last year, when I was young. (negative adverb: not, n't) |
| (Black) Articles | 12 | A/An/The |
| (Light blue) Prepositions | 13 | under, over, at, above, on, in |
| (pink) Conjunctions | 14 | and, because, or, but |
| multicolored card: (All syntactic units) | 15 | Used for correction. This card is placed in the place of an error or if a syntactic unit is missing. |
| red question mark: interrogatives | 16 | What are you doing? |
| Yellow question mark: auxiliaries | 16 | Is she here? |
| White period: Nouns | 16 | Tom is here. |
| Orange period: pronouns | 16 | He is here. |
| White exclamation mark: | 16 | Tom is finally here! |
| Orange exclamation mark: | 16 | He is finally here! |

Note all punctuation has, is the same color as the initial word in the sentence: e.g., If the sentence begins with "He", an orange period is required. If the sentence begins with "A table", a white period is required. If the sentence is an interrogative, a red question mark is required. If the sentence begins with "Are", a yellow question mark is required.

Capital letter mark: C

One punctuation cube consists of the following 6 sides: orange period, white period, yellow question mark, red question mark, C and a white and orange exclamation mark. See FIG. 15 which shows all 6 sides.

Figure 1:
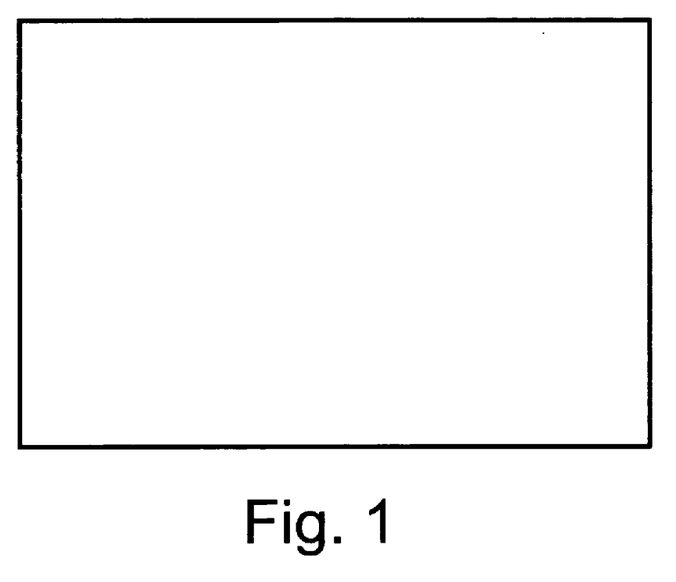
FIG. 1 is a plan view of the red color card used for interrogative pronouns in one embodiment of the present invention.
Figure 2:
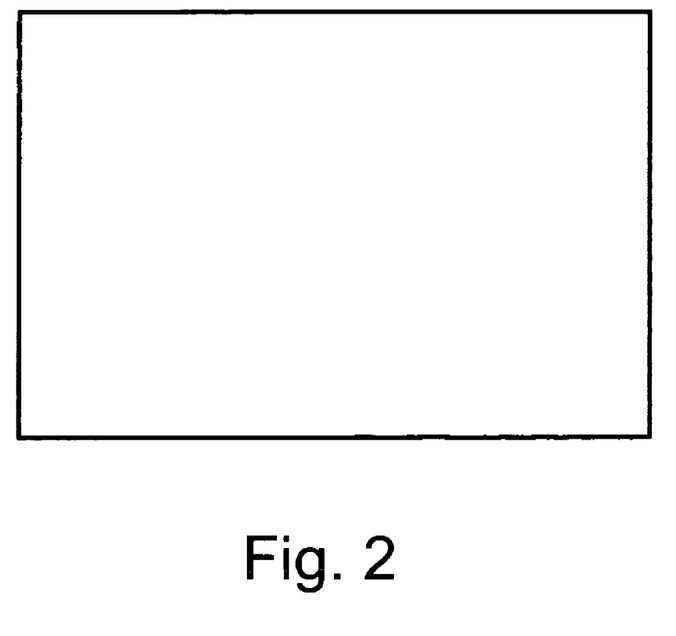
FIG. 2 is a plan view of the yellow card used for auxiliary and modal auxiliaries in the present invention.
Figure 3:
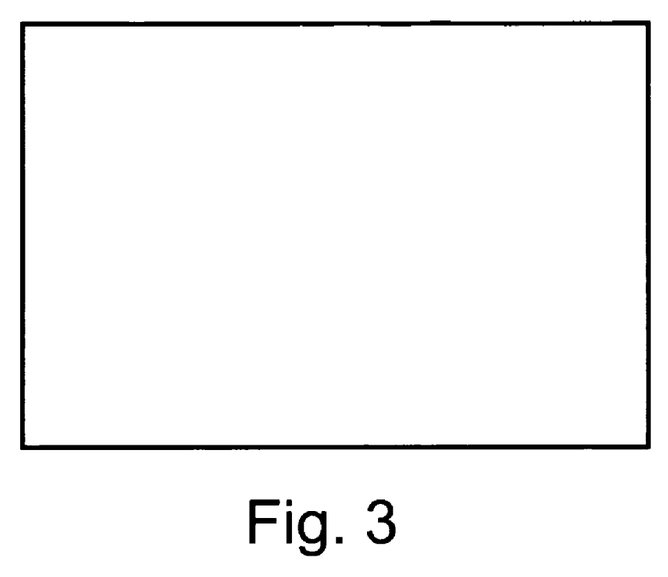
FIG. 3 is a plan view of the orange card used for pronouns in the present invention.
Figure 4:
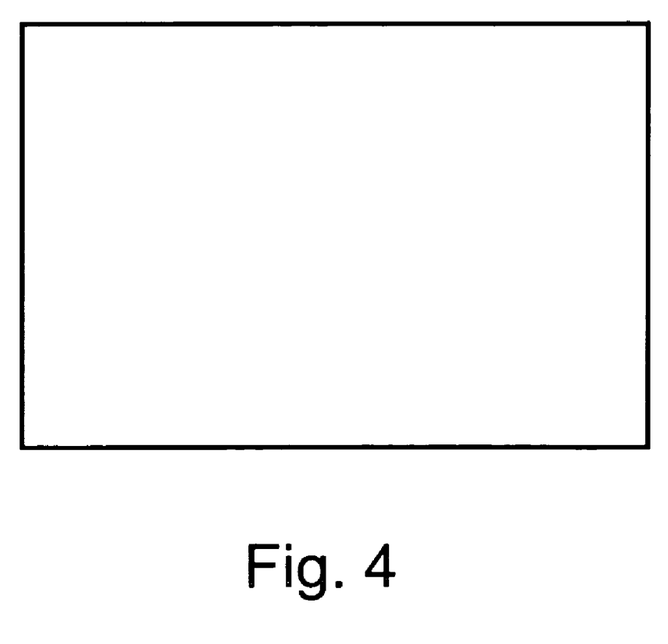
FIG. 4 is a plan view of the blue card used for adverbs in the present invention.
Figure 5:
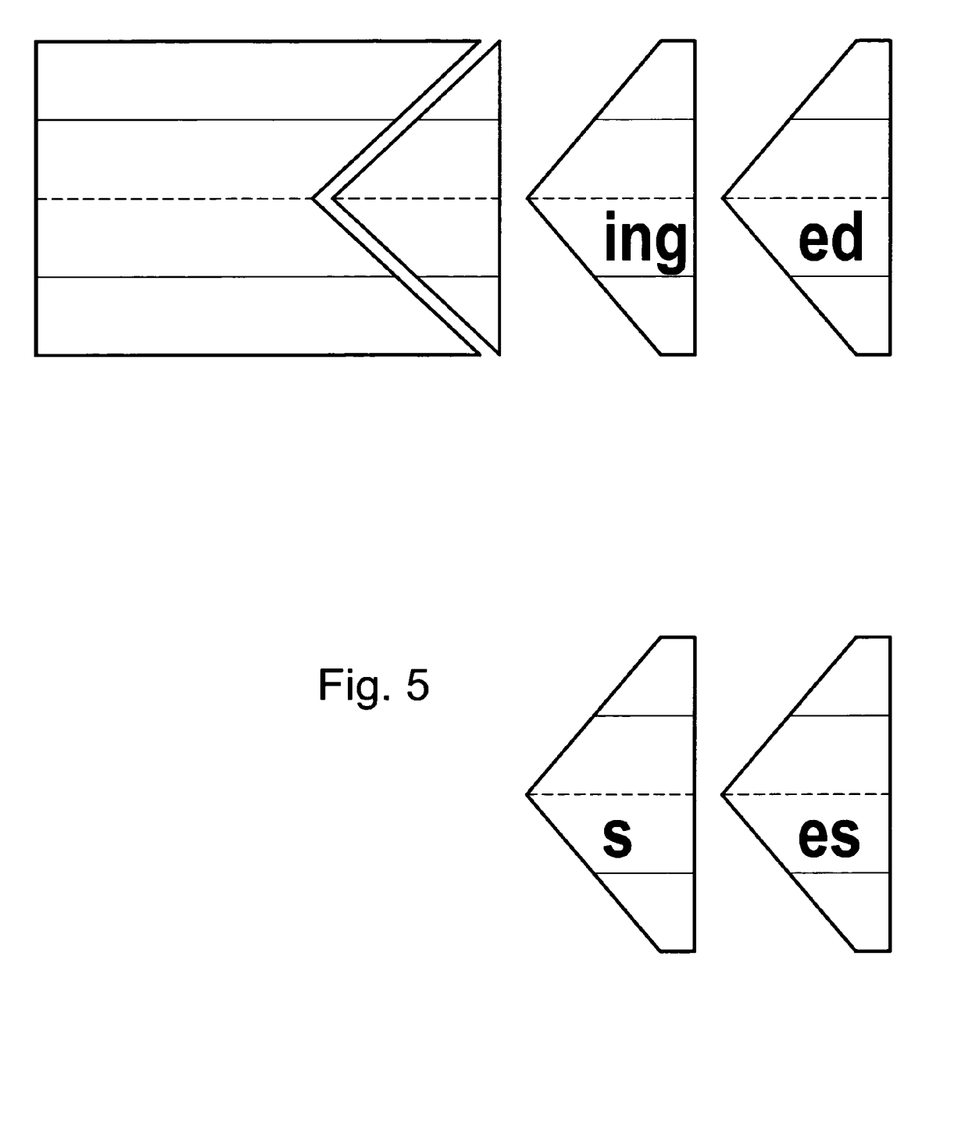
FIG. 5 is a plan view of the puzzle piece along with four (4) other verb endings to be selectively associated therewith.
Figure 6:
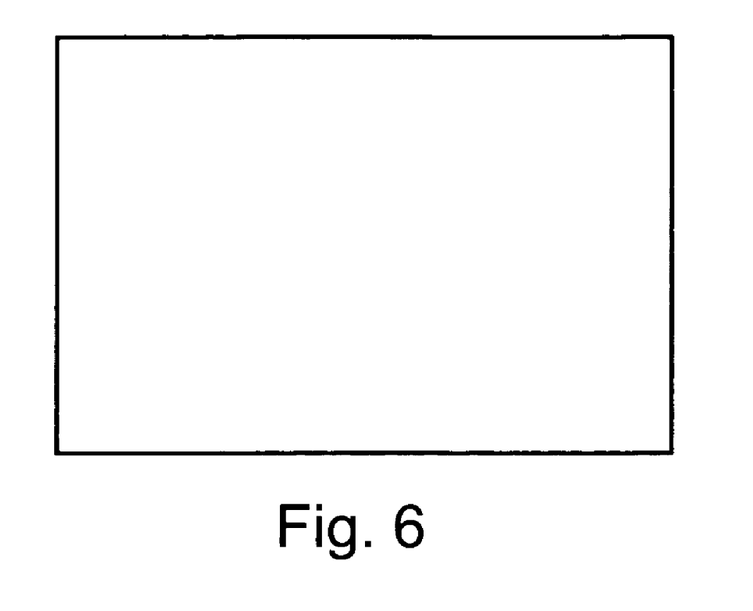
FIG. 6 is a plan view of the green card used for adjectives in the present invention.
Figure 7:
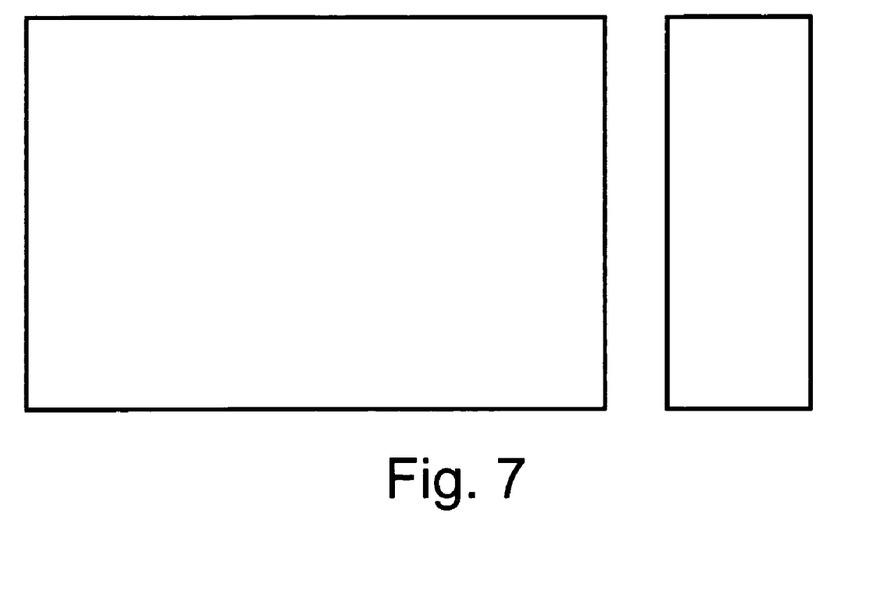
FIG. 7 is a plan view of the purple card used for adverbial adjuncts in the present invention.
Figure 8:
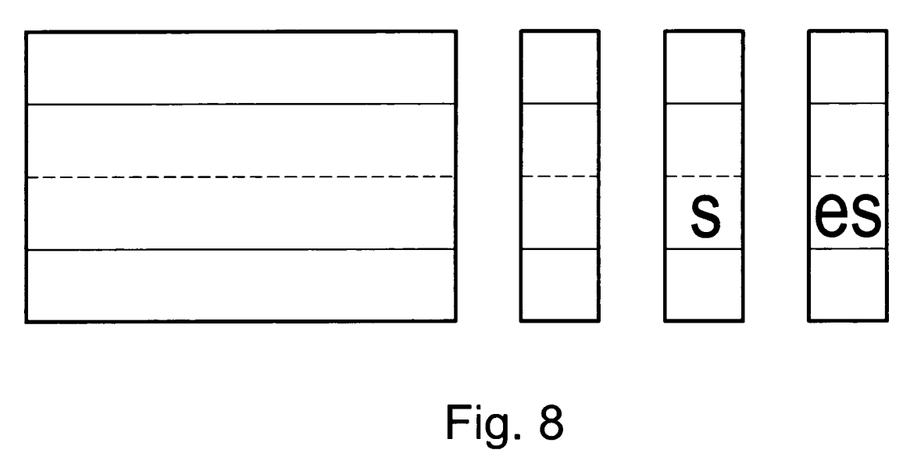
FIG. 8 is a plan view of the white cards used for noun suffixes in the present invention.
Figure 9:
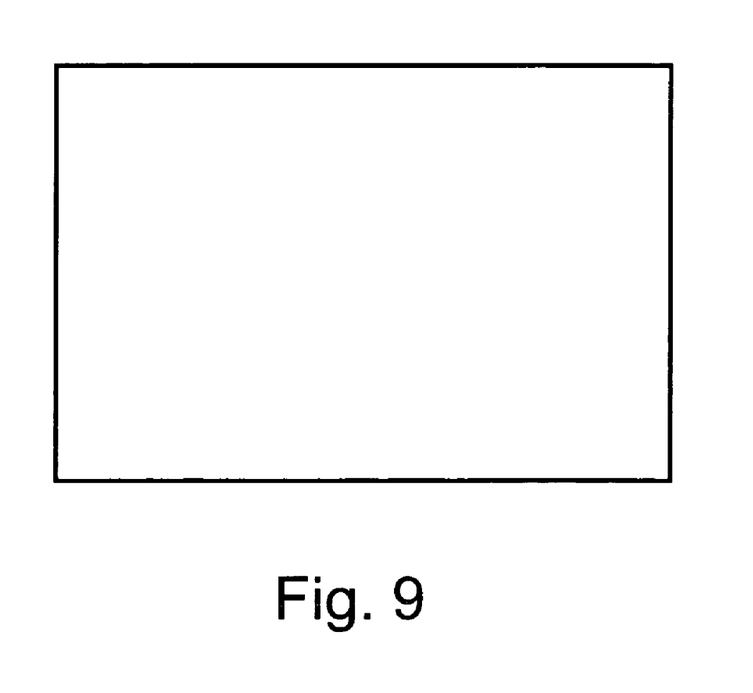
FIG. 9 is a plan view of the purple card used for adverbial adjuncts in the present invention.
Figure 10:
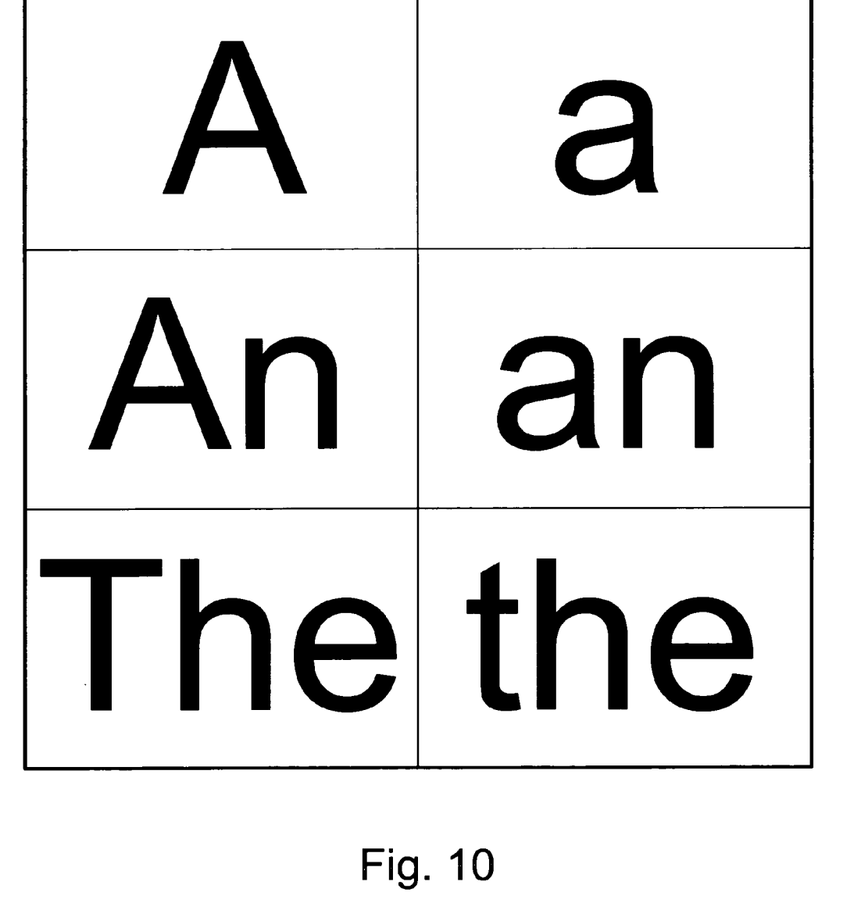
FIG. 10 is a plan view of the black cards used for articles in the present invention.
Figure 11:
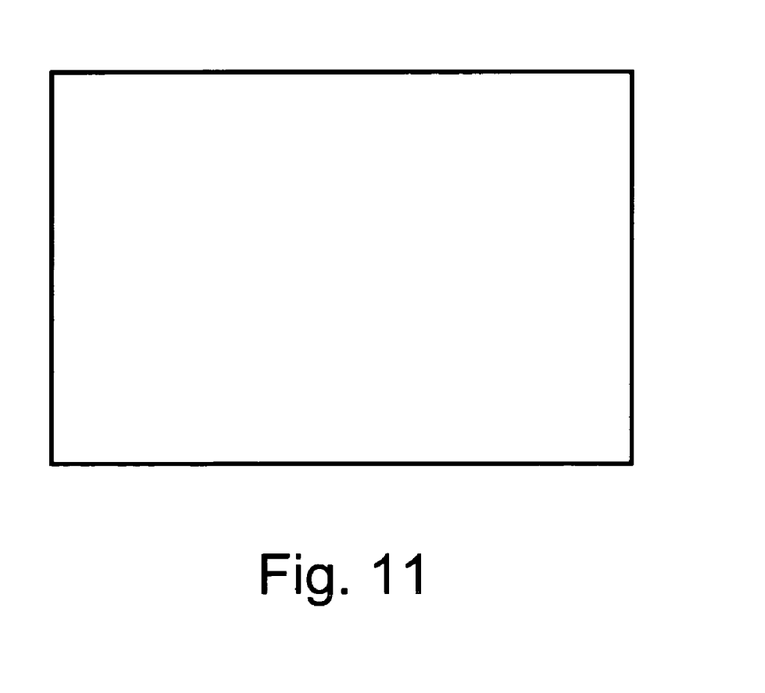
FIG. 11 is a plan view of the light blue card used for prepositions in the present invention.
Figure 12:
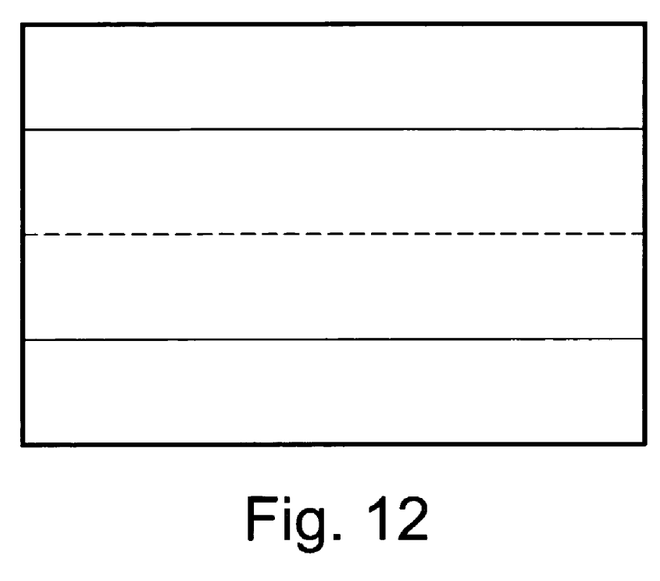
FIG. 12 is a plan view of the pink card used for conjunctions in the present invention.
Figure 13:
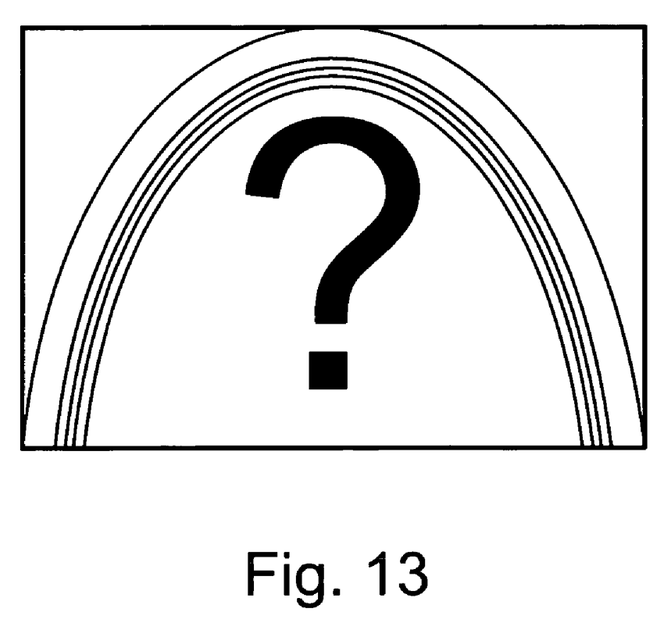
FIG. 13 is a plan view of the multicolored card used for correction or the missing pieces in the present invention.
Figure 14:
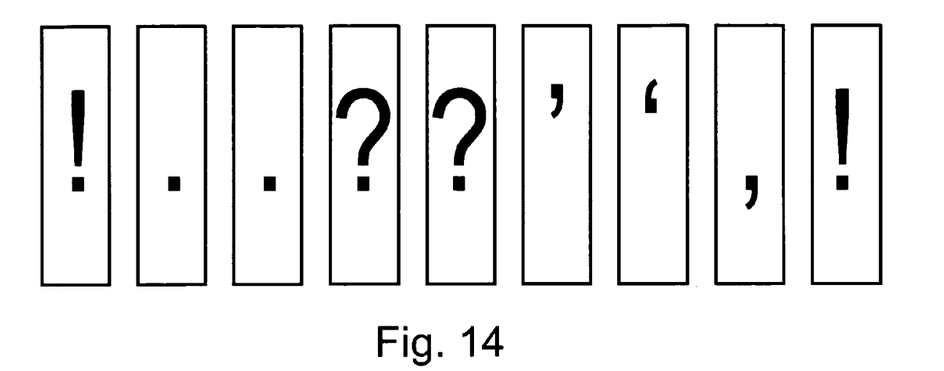
FIG. 14 is a plan view of the colored cards used for a number of punctuation marks in the present invention.
Figure 15:
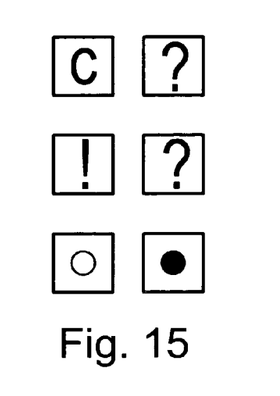
FIG. 15 is a plan view of all six sides of one of the punctuation mark cubes used in the present invention.
Figure 16:
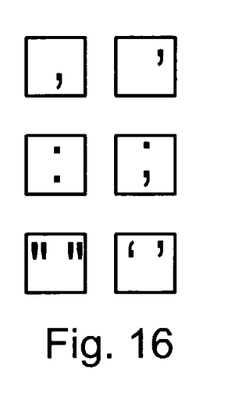
FIG. 16 is a plan view of all six sides of the other punctuation mark cube used in the present invention.
Figures 17, 21:
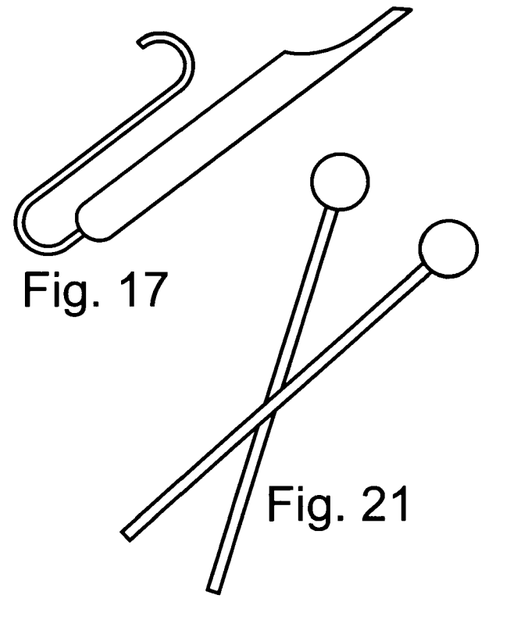
FIG. 17 is a perspective view of the red slide used for interrogative pronouns in another embodiment of the present invention.
FIG. 21 is a perspective view of the two crossed sticks with bells used for main verbs in the present invention.
Figure 18:
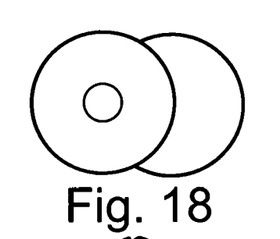
FIG. 18 is a perspective view of the yellow cymbals used for auxiliaries in the present invention.
Figure 19:
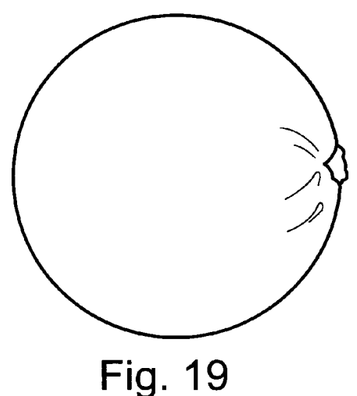
FIG. 19 is a perspective view of the orange shaker used for pronouns in the present invention.
Figure 20:
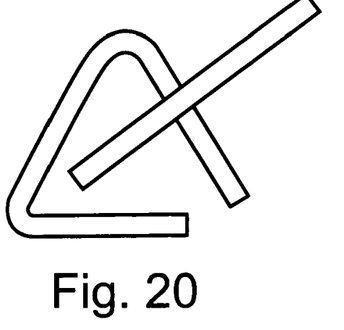
FIG. 20 is a perspective view of the blue triangle used for adverbs in the present invention.
Figure 22:
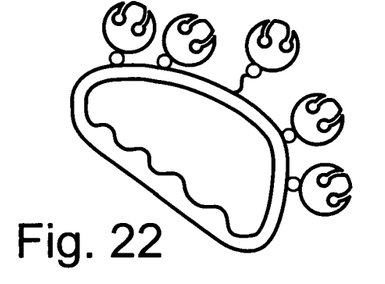
FIG. 22 is a perspective view of the green shaker bell used for adjectives in the present invention.
Figure 23:
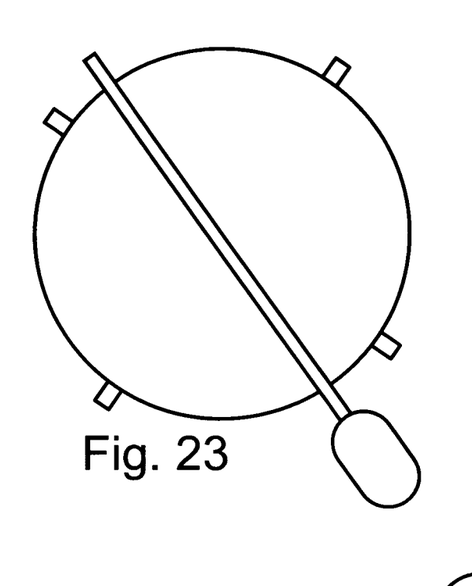
FIG. 23 is a perspective view of the white drum used for nouns in the present inventi4n.
Figure 24:
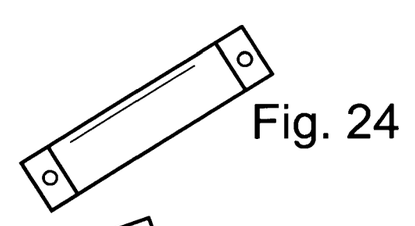
FIG. 24 is a perspective view of the purple harmonica used for adverbials in the present invention.
Figure 25:
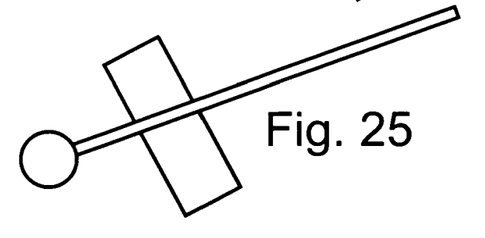
FIG. 25 is a perspective view of the black woodblock used for articles in the present invention.
Figure 26:
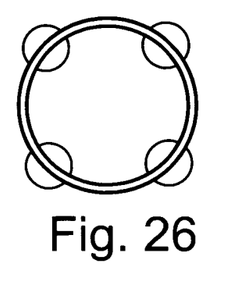
FIG. 26 is a perspective view of a pink tambourine used for conjunctions in the present invention.
Figure 27:
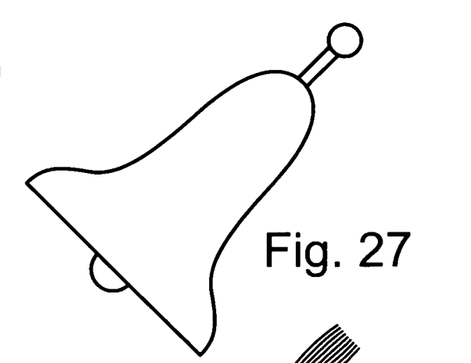
FIG. 27 is a perspective view of the light blue bell used for prepositions in the present invention.
Figure 28:
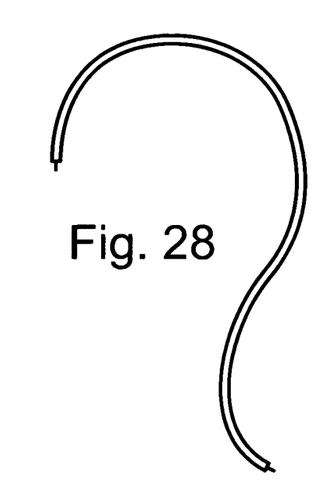
FIG. 28 is a perspective view of the red wavy pipe cleaner used for interrogative pronouns in another embodiment of the present invention.
Figures 29, 30:
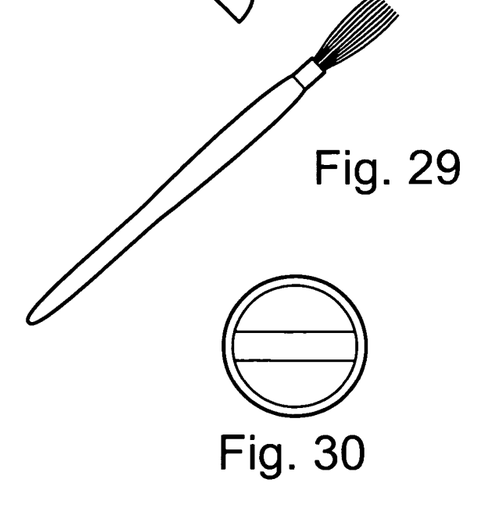
FIG. 29 is a perspective view of the yellow pain brush used for auxiliaries in the present invention.
FIG. 30 is a perspective view of the orange Velcro ball used for pronouns in the present invention.

The other punctuation cube (FIG. 16) consists of the following sides:

| | |
|---|---|
| Comma | , |
| Apostrophe | ' |
| Colon | : |
| Semicolon | ; |
| Quotes | " " |
| Parenthesis | ( ) |

This invention in preferred form consists of eight basic steps for learning a foreign language, learning a second language and for accelerating the language learning process with students who are speech impaired, dyslexic or autistic and to students of exceptional ability. Only some of these steps are needed for native speakers who need to learn syntactic analysis and for native speakers having special needs:

1. New vocabulary and linguistic items are introduced through a dialogue. This is in audible form (teacher, tape, cd, video, multimedia). The students look at a picture depicting the passage/dialogue as they listen. The listening pieces are authentic language and are used to later generate authentic language from the students.

2. The students' listening comprehension is checked through a series of activities. The listening piece may be played again, and it is recommended that the students repeat after listening for pronunciation and intonation practice. Students may role-play the dialogues.

3. The students listen to and sing songs with the new linguistic items being presented as they look at a picture depicting the song. Students sing with gestures, which carry meaning. Gestures are used as much as possible throughout the lesson. The teacher may refer back to the song when a student is struggling with a structure or when the student makes a mistake with the structure for reinforcement.

4. The teacher puts up/lays out the new linguistic structure being taught in the lesson on the board with the teacher's color cards. It is important to put up the question and the answer form. The students color and copy the structure put up/laid out in a meaningful picture which illustrates the structures being taught. The cards are also used to present the differences in language 1 syntax verses language 2 syntax (contrastive analysis) when teaching a foreign language. Punctuation is also taught and reinforced with color-coded punctuation cubes. (include a picture). When a student makes a punctuation mistake, the teacher takes out the punctuation cube box. The student will automatically check his/her sentence for mistakes. If he/she cannot correct the punctuation, the teacher puts the cube with the correction piece face up over the place in the sentence where punctuation is wrong or missing. The student self corrects. The teacher will put the punctuation cube back in the box when the student writes another sentence without mistakes. The object is to finish the class with all the pieces back in the punctuation box.

5. The teacher elicits the linguistic item being taught from the students in meaningful exercises. So far they have learned the new linguistic items unconsciously. This step is to consciously make the students aware of what they have learned. This is important to achieve long-term memory of what is being taught. If applicable the teacher will tell the students a grammar story. The grammar stories teach the students the linguistic item they are learning and focus on preventing and correcting the "mistakes" that foreigners typically make due to language I syntax differences. These stories should be used when the students make mistakes as reinforcement of the correct usage of the language 2 structures. These stories make the abstract concept of language become "concrete" through the personification of the syntactic structures thus enabling students with speech disabilities to understand language syntax. They also link syntactic structures and put language in a time and space relationship. Some of the words are the boss words: (Adverbials) and some are followers (verbs). Through the grammar stories, the students learn that the bosses decide if the puzzle piece will be empty or full and if we need a yellow word or not. Students without a disability find the stories to be a great source of memory help in stamping in the new syntax presented in the second language, which makes replacing the language 1 syntax much easier.

6. The students have their own color cards with which they generate their own sentences. Different activities are used to create meaningful exercises to generate language. The teacher monitors their work and has them read the sentences out loud and self edit. Corrections are made with a reference to a song learned in step 2, a grammar story or through the color cards. For this step to be successful it is important to correct through questions in order to get the student to generate his/her own sentence. The student will then be able to self edit his/her own work in the future.

7. "Beat the Clock" is a game which teaches students to categorize and to apply the new syntax in different situations. The student is given a category which will be the new linguistic structures and lexicon used in the lesson. Students are timed and must use each new structure in complete sentences. The students' race against the clock and the object is to beat the previous race against the clock by generating more sentences in a given time. This gives the students practice in categorizing and rapid naming. These two abilities are important in developing vocabulary and help in improving reading comprehension skills.

8. The students are assessed on their progress. These assessments are used as an aid for the teacher to see how much the students have internalized and as a review of the lesson. The teacher may repeat parts of the lesson as reinforcement if necessary. Students with disabilities need much recycling so parts of the lesson may be repeated at a later date for reinforcement and as a means of checking long-term memory.

The students will be doing homework with simple reinforcement exercises. Students with disabilities need many opportunities to repeat the new item being taught. The students will also have a reader which they will read every night. Young learners will read to their parents. The homework for the young learners is designed so that the parents who do not speak the language being taught can learn by doing the homework. Parents can be given a homework book with the expectation that they do the homework and help or get help from their child. At the end of the course the parent will be able to participate in a competition with their children where they will play "Beat the Clock". The idea behind including the parents in the child's education is twofold. It enables the parents to acquire linguistic advancement and helps the child receive the help he/she needs at home from the parent. It also gets the parents more involved in the new culture and teaches the parents how to integrate into the community.

The following dialog is an example of a grammar story utilizing color coding and teaching the present continuous tense:

Story time: ing . . . ing . . . ing . . . ING loves now. He is a very, very happy "ing". "Ing" never worries about the past. "Ing" enjoys the present. He loves right now, at this moment, NOW! If you say "ing" you didn't do your homework! He will smile and say, "I am doing it right now!" If you say, "Ing you forgot your lunch." He will say "I am eating your lunch right now." "Ing" loves now, right now and at this moment. Now "Ing" has three friends he is always, always, always with. Look at the sentences in your book or on the board to see who they are.

Color cards:

I am talking right now.

He is playing now.

We are working at this moment.

I will give you a hint. "Ing's" favorite color is YELLOW! Yes, you're right: his friends are "am", "is" and "are". So remember when you are talking about the purple words right now, now, at this moment remember to use "ing" with his yellow friends "am, "is" and "are"!

The following is the sound coding used in a second embodiment of the present invention.

| Sound Coding: Musical Instruments | | |
|---|---|---|
| Color Syntactic Unit | Figure | Examples |
| Interrogative pronouns: | 19 | A red slide (In) |
| Auxiliaries: | 20 | Yellow cymbals |
| Pronouns: | 21 | Orange shaker |
| Adverbs: | 22 | Blue triangle |
| Main Verbs: | 23 | Two bell sticks (The sticks are played in front and below for the present tense, in back for the past tense and straight out in front for the future tense. They are played in these same positions and dragged out for the continuous tenses. there is a double past tap behind for the past perfect tense and a close present tap for the present perfect tense.) |
| Adjectives: | 24 | Green shaker bell |
| Nouns: | 25 | White drum |
| Adverbials: | 26 | Purple harmonica |
| Articles: | 27 | Black woodblock |
| Conjunctions: | 28 | Tambourine |
| Prepositions: | 29 | light blue bell |
| Punctuation marks: | | |
| Comma: | | low snap |
| Apostrophe: | | high snap |
| Question mark: | | red slide (out) |
| Period: | | drum if the sentence begins with a noun shaker if the sentence begins with a pronoun |
| Exclamation mark: | | drum and shaker |

The steps for this sound and movement embodiment are as follows:
1. A new vocabulary and linguistics are introduced through an audible dialogue.
2. The students repeat the structure verbally.
3. Student 1 plays the structure with the sound devices using linguistic sound coding.
4. The teacher monitors, modals and corrects the student's production of the linguistic structure making certain that the student uses the correct gesture indicating the time when playing the verb piece. The teacher also makes sure that the student plays the sound device which corresponds to the correct punctuation and manipulates and moves the sound pieces to teach word order, syntax, cohesion and other linguistic features.
5. Student 2 responds to student 1 verbally and by playing the sentence with the sound devices.
6. The students write the structure and draw pictures of the sound elements corresponding to the structure. If working on a computer, the student would arrange the sounds in the correct order with the corresponding words and punctuation cards.

The following dialogue is an example of a grammar story utilizing auditive sound coding to teach the present continuous tense:

Story time: ing . . . ing . . . ing . . . ING loves now. He is very, very happy "ing". "Ing" never worries about the past. "Ing" enjoys the present. He loves right now, at this moment, NOW! If you say "ing" you didn't do your homework! He will smile and say, "I am doing it right now!" If you say, "Ing you forgot your lunch. He will say "I am eating your lunch right now." "Ing" loves now, right now and at this moment. Now "Ing" has three friends he is always, always, always with. Let's play the following sentences to see who they are.

Sound: The students play the correct coded instruments and the teacher puts up the sound cards with the corresponding words. The teacher asks, "What do we say when we play the 'symbal'"?

I am talking right now.
He is playing now.
We are working at this moment.

I will give you a hint. "Ing's" favorite sound is the cymbal! Yes, you're right: his friends are "am", "is" and "are". So remember when you are talking about the harmonica words "right now", "now" and "at this moment", remember to use "ing" with his cymbal friends: "am", "is" and are"!

Figure 31:
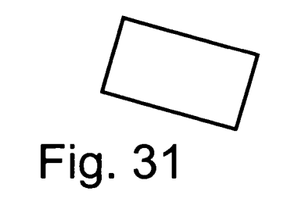
FIG. 31 is a perspective view of the blue sponge used for adverbs in the present invention.
Figure 32:
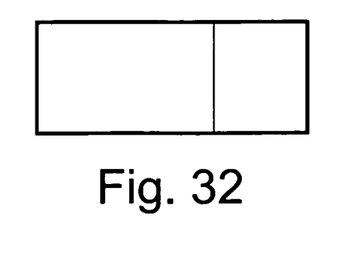
FIG. 32 is a perspective view of the main verb plus puzzle piece used for verbs in the present invention.
Figure 33:
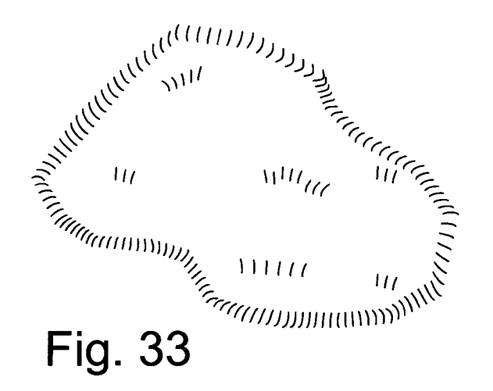
FIG. 33 is perspective view of the green fur piece used for adjectives in the present invention.
Figure 34:
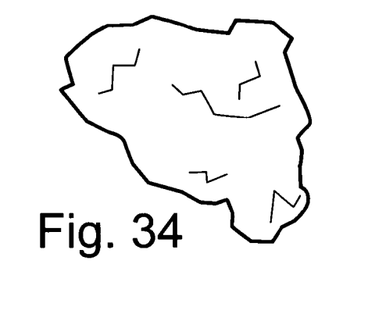
FIG. 34 is a perspective view of the rough textured rock used for nouns in the present invention.
Figure 35:
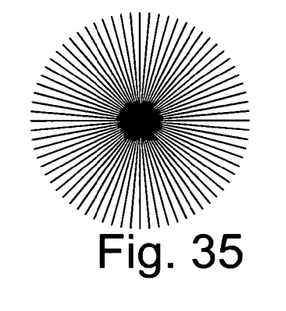
FIG. 35 is a perspective view of the kush ball used for adverbials in the present invention.
Figure 36:
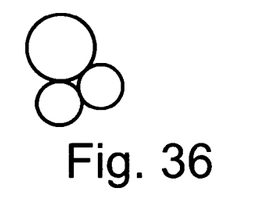
FIG. 36 is a perspective vie of the three round balls used for articles in the present invention.
Figure 37:
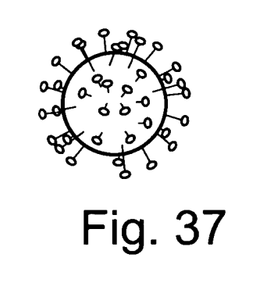
FIG. 37 is a perspective view of the pin cushion used for prepositions in the present invention.
Figure 38:
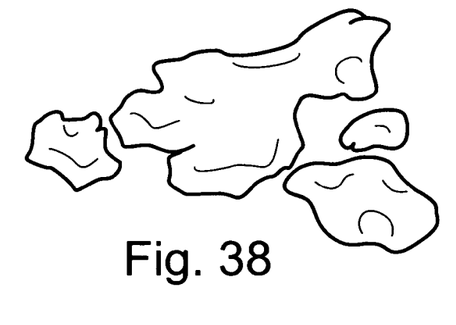
FIG. 38 is a perspective view of the pink play dough used for conjunctions in the present invention.

The following is the shape/texture coding used for the third embodiment of the present invention:

| Shape correspondence: Shape/Texture | |
|---|---|
| Interrogative pronouns: | red wavy pipe cleaner (FIG. 30) |
| Auxiliaries: | yellow paint brush (FIG. 31) |
| Pronouns: | orange Velcro ball (FIG. 32) |
| Adverbs: | blue sponge (FIG. 33) |
| Verbs: | puzzle piece (two pieces making a rectangular shape with the left side being longer than the right side, the left side being smooth and the right side being rough) (FIG. 34) |
| Adjectives: | green fur piece (FIG. 35) |
| Nouns: | solid rock with rough texture (FIG. 36) |
| Adverbials: | kush ball (student shows time with the ball by tossing or rolling the ball) (FIG. 37) |
| Articles: | 3 round balls (students cross their fingers and roll the round ball for "a" and "an", and for "the" they touch the round ball with their fingers uncrossed) (FIG. 38) |
| Prepositions: | pin cushion (FIG. 39) |
| Conjunctions: | pink play dough (FIG. 40) |
| Punctuation: | If the sentence begins with an interrogative pronoun, then the question mark will be a red wavy pipe cleaner. If the sentence begins with a noun, then it will end in a solid rock with a rough texture. If the sentence begins with an orange word, then it will end in an orange Velcro ball. |

The steps for this Shake/Texture embodiment are as follows:
1. The students are presented with a situation through an audible dialogue.
2. The students generate the structure verbally.
3. The students place the shape-coded devices in the correct word order and touch each shape as they form a sentence.
4. The teacher monitors, modals and corrects the student's production of the linguistics' structure. The teacher makes certain that the student places the verbs puzzle shape in the correct slot for past, present or future time and that the right side of the puzzle has the right conjugation. The teacher uses grammar stories to teach and correct linguistic concepts. Movements of the shapes are used together with the grammar stories and for teaching and correcting.

Punctuation is also shape coded and must be used appropriately. Gestures are also used to teach semantic and syntactic meaning.

5. The students may close their eyes and touch the shapes as they simultaneously say the sentence they have formed with the shapes.

6. The students carry out dialogues with each other by asking and answering questions which are elicited by the teacher. The sentences are to be role-played verbally first followed by positioning the shapes in the correct order and then feeling the shape while verbally saying the sentence.

7. The students draw pictures with the linguistic shapes and their corresponding linguistic units and punctuations.

8. The following dialogue is an example of a grammar story utilizing kinesthetic shape/texture coding to teach the present continuous tense:

Story time: ing . . . ing . . . ing . . . ING loves now. He is a very, very happy "ing". "Ing" never worries about the past. "Ing" enjoys the present. He loves right now, at this moment and NOW! If you say "ing" you didn't do your homework! He will smile and say, "I am doing it right now"! If you say, Ing, you forgot your lunch". He will say, "I am eating your lunch right now". "Ing" loves now, right now and at this moment. Now "Ing" has three friends he is always, always, always with. Let's play the following sentences to see who they are.

Shapes/textures: The students put the correct shapes/textures out in the correct order to the sentences written below and say the sentence as they touch the shape/texture.

I am talking right now.
He is playing now.
We are working at this moment.

I will give you a hint. "Ing" loves soft things and loves to paint so who are his friends? Yes, you're right—his friends are "am", "is" and "are". So remember when you are talking about the line words right now, now, at this moment, remember to use "ing" with his paint brush friends: "am", "is" and "are"!

Thus, the present invention provides a novel method for teaching a given language to one or more users. It can be applied, not only to learning a second language, but also to learn the syntax of a native language (for a regular language classroom) and for teaching a student his or her own language when the student has speech impairment or a learning disability. It emphasizes that learning a language is an unconscious to conscious process. It includes a multi-sensory approach which includes sound, color, touch/texture and movement emphasizing that the more senses that are utilized in learning a language, the deeper and more permanent learning becomes.

Having shown and described the preferred embodiment of the invention, those skilled in the art will realize that many variations and modifications may be made to effect the described invention and still be within the scope of the claimed invention. Thus, many of the activities indicated herein may be altered or replaced by different activities which will provide the same result and fall within the spirit of the claimed invention. It is the intention, therefore, to limit the invention only as indicated by the scope of the claims.

What is claimed is:

1. A method of teaching students a language utilizing color coded cards, musical instruments and article shapes and textures so that the students learn the language through colors, sounds, article shapes and textures, verb puzzle pieces, at least one punctuation cube, gestures, and grammar stories, the method comprising the steps of: introducing an authentic new language vocabulary in recorded form while displaying a picture relating to the new language vocabulary to the students and having the students repeat the new language vocabulary verbally; having the students place the article shapes in the correct word order and touch each article shape as the new language vocabulary is formed; receiving, correcting and assuring that the students place the verb puzzle piece introducing a song in the authentic new language vocabulary in recorded form while displaying a picture relating to the song and new language vocabulary and having the students sing the song with gestures; displaying the color cards reflecting the new vocabulary in question and answer form where the students may view, color and copy the displayed cards; having the students use the color cards to generate sentences answering the questions asked; monitoring student sentences and having students correct errors by asking questions and having students correct with sentences formed with the color cards; and reviewing the submissions of the students to determine if a satisfactory number of correct sentences by the students has been submitted and if a repetition of any previous steps is needed.

2. The method as claimed in claim 1 wherein the puzzle piece is a white card with a notch adapted to connect with another white card having displayed alternative verb endings.

3. The method as claimed in claim 1 wherein the at least one punctuation cube has a first orange period side, a second white period side, a third question mark side, a fourth yellow question mark side, a fifth white orange and white question mark side, and a sixth capital letter side.

4. The method as claimed in claim 1 wherein another of the at least one punctuation cube has a first comma side, a second apostrophe side, a third colon side, a fourth semi-colon side, a fifth quote marks side, and a sixth parentheses side.

5. The method as claimed in claim 1 further comprising the steps of: giving the students a subject category from the new language vocabulary being taught and providing a game using the new language vocabulary to be played and timed.

6. The method as claimed in claim 5 further comprising the step of: repeating the game one or more times to challenge the students to shorten previous times of play or form more sentences in a given period of time.

7. A method of teaching students a language utilizing colored cards, musical instruments and sounds, and article shapes and textures, so that the students learn through colored cards, instruments and instrument sounds, verb puzzle pieces, gestures, and grammar stories, the method comprising the steps of: introducing a dialogue through an authentic new language vocabulary in recorded form while displaying a picture depicting dialoge through the new language vocabulary to the students and having the students repeat the dialogue in the new language vocabulary audibly; displaying the musical instruments reflecting the dialogue in the new language vocabulary in question and answer form where the students may view, color and copy the musical instruments; having the students prepare the dialogue in the new language vocabulary by identifying, selecting and playing the musical instruments corresponding to the dialogue in the new language vocabulary; presenting a grammar story utilizing musical instruments and musical instrument sounds to teach the authentic new language vocabulary; and having the students respond to questions about the grammar story by identifying and playing the appropriate musical instruments to convey correct answers to the questions.

8. A method of teaching students a language utilizing so that the students learn through colored cards, musical instruments and sounds, article shapes and textures, verb puzzle pieces with a first card having a main verb portion and a second card having alternate verb endings, gestures, and grammar stories, the method comprising the steps of: introducing an authentic new language vocabulary in recorded form while displaying a picture relating to the new language vocabulary to the students and having the students place the article shapes in the correct word order and touch each shape as the new language vocabulary is formed; receiving, correcting and assuring that the students place the verb puzzle piece second card in the correct location with respect to the first card to reflect past, present or future tense; moving the shaped and textured articles and using grammar stories to enable teaching and correcting; directing the use of gestures to teach semantic and syntactic meaning; having the students close their eyes and touch the shaped and textured articles as the students simultaneously recite the new language vocabulary the students have formed; and having the students write the new language vocabulary and draw pictures of the shaped and textured articles corresponding to the new language vocabulary.

9. The method as claimed in claim 7 further comprising the steps of: giving the students a subject category from new words being taught and arranging a game using these words to be played and timed.

10. The method as claimed in claim 9 further comprising the steps of: repeating the game one or more times to challenge the students to shorten their previous play times.

\* \* \* \* \*